US012308190B2

(12) United States Patent
Priest

(10) Patent No.: US 12,308,190 B2
(45) Date of Patent: May 20, 2025

(54) CONTACTOR WITH MULTI-GAP ACTUATOR

(71) Applicant: TE Connectivity Solutions GmbH, Schaffhausen (CH)

(72) Inventor: Marcus Priest, Carpinteria, CA (US)

(73) Assignee: TE Connectivity Solutions GmbH (CH)

( * ) Notice: Subject to any disclaimer, the term of this patent is extended or adjusted under 35 U.S.C. 154(b) by 215 days.

(21) Appl. No.: 17/702,974

(22) Filed: Mar. 24, 2022

(65) Prior Publication Data

US 2023/0307201 A1 Sep. 28, 2023

(51) Int. Cl.

| | |
|---|---|
| ***H01H 50/54*** | (2006.01) |
| ***H01H 50/02*** | (2006.01) |
| ***H01H 50/44*** | (2006.01) |
| ***H01H 50/64*** | (2006.01) |

(52) U.S. Cl.
CPC .......... *H01H 50/546* (2013.01); *H01H 50/02* (2013.01); *H01H 50/44* (2013.01); *H01H 50/641* (2013.01)

(58) Field of Classification Search
None
See application file for complete search history.

(56) References Cited

U.S. PATENT DOCUMENTS

| | | | | |
|---|---|---|---|---|
| 4,240,056 A | | 12/1980 | Mayer | |
| 4,292,611 A | * | 9/1981 | Bresson | H01H 3/222 335/147 |
| 7,852,178 B2 | | 12/2010 | Bush et al. | |
| 8,459,218 B2 | | 6/2013 | Keller et al. | |
| 8,686,814 B2 | * | 4/2014 | Bach | H01H 3/222 335/131 |
| 2016/0181038 A1 | * | 6/2016 | Shimizu | H01H 50/42 335/165 |

* cited by examiner

*Primary Examiner* — Bernard Rojas

(57) ABSTRACT

A contactor includes a housing having a cavity with fixed contacts received in the cavity and a movable contact movable within the cavity to mate to the fixed contacts and unmate from the fixed contacts. The movable contact electrically connecting the fixed contacts in the mated position. A mating gap is formed between the movable contact and the fixed contacts when the movable contact is unmated from the fixed contacts. The contactor includes an actuator operably coupled to the movable contact to move the movable contact within the cavity relative to the fixed contacts. The actuator includes a primary coil assembly and a secondary coil assembly. The primary coil assembly is operable to move the movable contact. The secondary coil assembly is operable independently from the primary coil assembly to change a length of the mating gap.

20 Claims, 6 Drawing Sheets

CONTACTOR WITH MULTI-GAP ACTUATOR

BACKGROUND OF THE INVENTION

The subject matter herein relates generally to high power electrical contactors.

Certain electrical applications, such as HVAC, power supply, locomotives, elevator control, motor control, aerospace applications, hybrid electric vehicles, fuel-cell vehicles, charging systems, and the like, utilize electrical contactors having contacts that are normally open (or separated). The contacts are closed (or joined) to supply power to a particular device. When the contactor receives an electrical signal, the contactor is energized to introduce a magnetic field to drive a movable contact to mate with fixed contacts. The length of travel of the movable contact impacts the closing time of the circuit. Having long closing strokes makes the contactor less responsive. However, having short closing strokes may lead to damage to the contacts, such as due to arcing or welding between the movable contact and the fixed contacts, due to an insufficient gap therebetween, particularly when transmitting high current.

A need exists for a contactor that overcomes the above problems and addresses other concerns experienced in the prior art.

BRIEF DESCRIPTION OF THE INVENTION

In one embodiment, a contactor is provided and includes a housing having a cavity. The contactor includes fixed contacts received in the cavity. The fixed contacts have mating ends in the cavity. The contactor includes a movable contact movable within the cavity to mate to the fixed contacts and unmate from the fixed contacts. The movable contact electrically connecting the fixed contacts in the mated position. A mating gap is formed between the movable contact and the fixed contacts when the movable contact is unmated from the fixed contacts. The contactor includes an actuator operably coupled to the movable contact to move the movable contact within the cavity relative to the fixed contacts. The actuator includes a primary coil assembly and a secondary coil assembly. The primary coil assembly is operable to move the movable contact. The secondary coil assembly is operable independently from the primary coil assembly to change a length of the mating gap.

In another embodiment, a contactor is provided and includes a housing having a cavity. The contactor includes fixed contacts received in the cavity. The fixed contacts have mating ends in the cavity. The contactor includes a movable contact movable within the cavity to mate to the fixed contacts and unmate from the fixed contacts. The movable contact electrically connecting the fixed contacts in the mated position. A mating gap is formed between the movable contact and the fixed contacts when the movable contact is unmated from the fixed contacts. The contactor includes an actuator operably coupled to the movable contact to move the movable contact within the cavity relative to the fixed contacts. The actuator includes a primary coil assembly and a secondary coil assembly. The primary coil assembly includes a primary core and a primary coil forming a first electromagnet. The primary coil assembly includes a primary armature holding a primary plunger. The primary plunger coupled to the movable contact to move the movable contact. The primary armature movable upon operation of the first electromagnet to move the primary plunger and the movable contact relative to the fixed contacts. The secondary coil assembly includes a secondary core and a secondary coil forming a second electromagnet. The secondary coil assembly includes a secondary armature holding a secondary plunger. The secondary plunger coupled to the primary plunger. The secondary armature movable upon operation of the second electromagnet to move the secondary plunger, wherein the secondary coil assembly is operable independently from the primary coil assembly to change a length of the mating gap by moving the position of the secondary plunger relative to the fixed contacts.

In a further embodiment, a contactor is provided and includes a housing having a cavity. The contactor includes fixed contacts received in the cavity. The fixed contacts have mating ends in the cavity. The contactor includes a movable contact movable within the cavity to mate to the fixed contacts and unmate from the fixed contacts. The movable contact electrically connecting the fixed contacts in the mated position. A mating gap is formed between the movable contact and the fixed contacts when the movable contact is unmated from the fixed contacts. The contactor includes an actuator operably coupled to the movable contact to move the movable contact within the cavity relative to the fixed contacts. The actuator operable in a short gap mode and an extended gap mode, wherein the mating gap has a first length in the short gap mode and the mating gap has a second length in the extended gap mode. The first length is shorter than the second length.

DETAILED DESCRIPTION OF THE INVENTION

Figure 1:
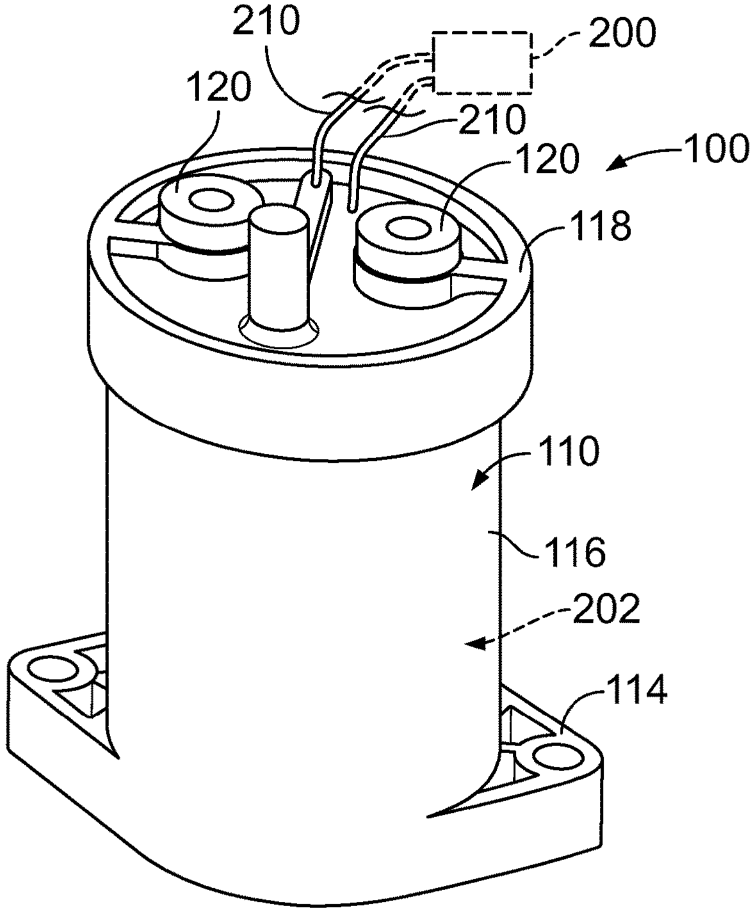
FIG. 1 is a perspective view of a contactor in accordance with an exemplary embodiment.
Figure 2:
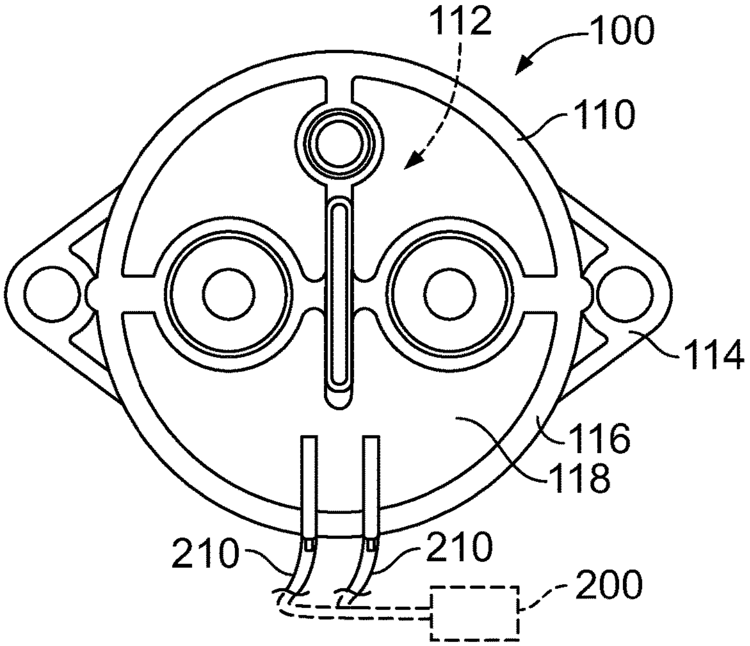
FIG. 2 is a top view of the contactor in accordance with an exemplary embodiment.

FIG. 1 is a perspective view of a contactor 100 in accordance with an exemplary embodiment. FIG. 2 is a top view of the contactor 100 in accordance with an exemplary embodiment. The contactor 100 is an electrical switch or relay that safely connects and disconnects one or more electrical circuits to protect the flow of power through the system. The contactor 100 may be used in various applications such as HVAC, power supply, locomotives, elevator control, motor control, aerospace applications, hybrid electric vehicles, fuel-cell vehicles, charging systems, and the like.

The contactor 100 includes a housing 110 having a cavity 112. The housing 110 may be a multi-piece housing in various embodiments. The housing 110 includes a base 114 and a header 116 extending from the base 114. Optionally, the base 114 may be configured to be coupled to another component. For example, the base 114 may include mounting brackets for securing the contactor 100 to the other component. In the illustrated embodiment, the header 116 is located above the base 114; however, the housing 110 may have other orientations in alternative embodiments. The housing 110 includes a cover 118 for closing the cavity 112. For example, the cover 118 may be coupled to the top of the header 116. Optionally, the cover 118 may be sealed to the header 116. In various embodiments, the cover 118 is coupled to the housing 110 to hermetically seal the cavity 112.

The contactor 100 includes fixed contacts 120 received in the cavity 112 and a movable contact 122 (FIG. 3) movable within the cavity 112 between a mated position and an unmated position. The movable contact 122 engages the fixed contacts 120 to electrically connect the fixed contacts 120 in the mated position and form a main circuit. The main circuit is opened and closed by the movable contact 122 (for example, opened in the unmated position and closed in the mated position). In the illustrated embodiment, the contactor 100 includes first and second fixed contacts 120; however, the contactor 100 may include greater or fewer fixed contacts in alternative embodiments. The fixed contacts 120 are fixed to the housing 110. For example, the fixed contacts 120 may be coupled to the header 116 and/or the cover 118. In other various embodiments, the fixed contacts 120 may be coupled to an insert or contact holder inserted into the cavity 112. In the illustrated embodiment, the fixed contacts 120 are post contacts. However, other types of contacts may be provided in alternative embodiments, such as pads or tabs. In the illustrated embodiment, the fixed contacts 120 are provided at the top of the contactor 100. However, the fixed contacts 120 may be provided at other locations in alternative embodiments.

In an exemplary embodiment, the contactor 100 includes a control system 200 for controlling operation of the contactor 100. The control system 200 controls switching of the main circuit. The control system 200 controls movement of the movable contact 122 between the open position and the closed position. In an exemplary embodiment, the control system 200 includes an actuator 202 (shown in phantom in FIG. 1) for actuating or moving the movable contact 122. In various embodiments, the actuator 202 includes electromagnets for operating the switch. In an exemplary embodiment, the actuator 202 includes multiple electromagnets that are operable independently to control operation of the contactor 100. For example, a first electromagnet may operate independently of a second electromagnet. The electromagnets are operable independently for different operation modes. For example, the actuator 202 may be operated in a first mode for normal operation, may be operated in a second mode for safety operation, such as when transmitting high currents, and may be operable in a third mode for service operation, such as for weld breaking when the movable contact is stuck to the fixed contacts. The actuator 202 may change the mating gap between the movable contact 122 and the fixed contacts 120 between the various modes, such as to increase or decrease the mating gap to change the switching time on closing the movable contact 122 or to enhance circuit interruption performance. The control system 200 includes control wires 210 for sending control signals to the contactor 100.

Figure 3:
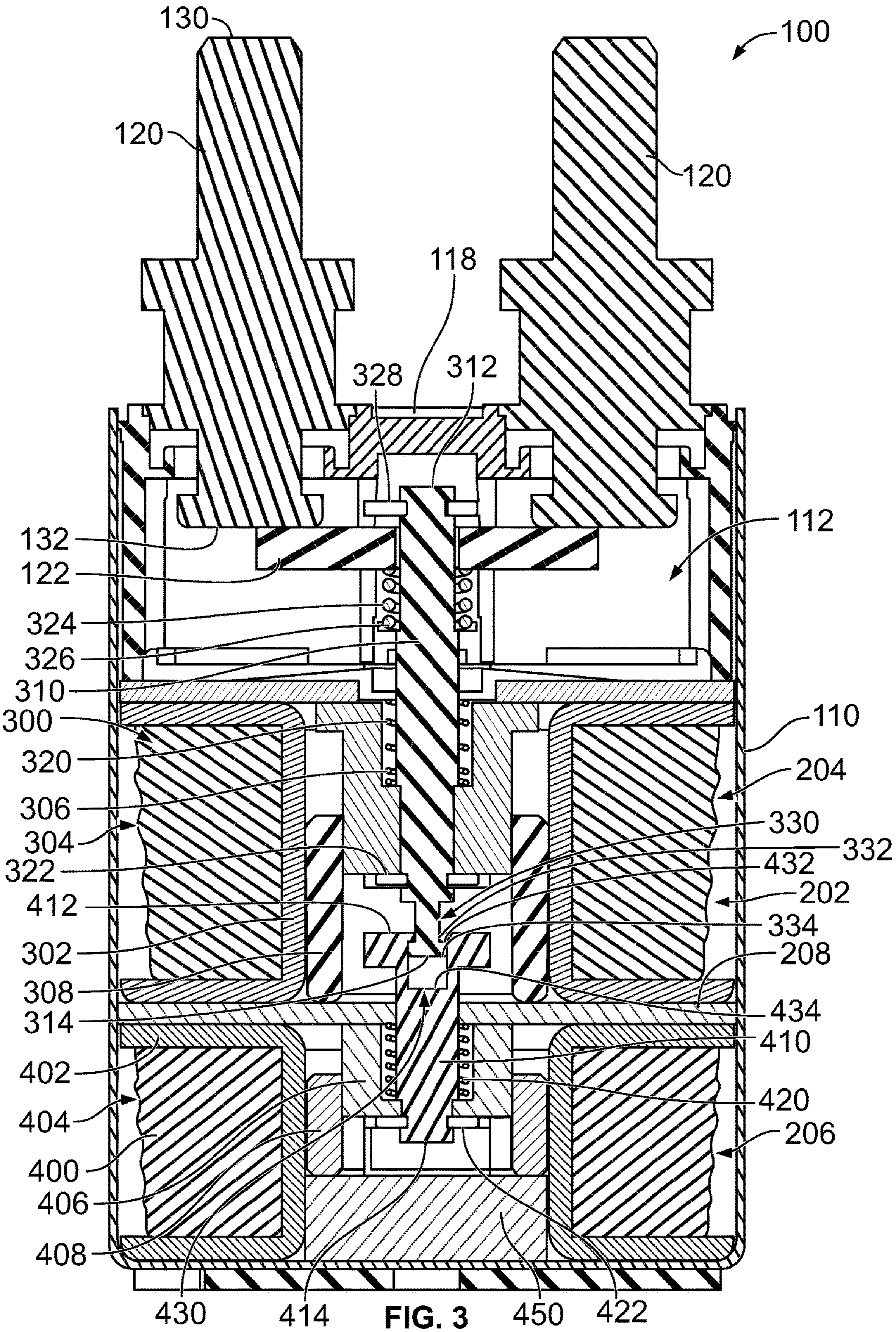
FIG. 3 is a cross-sectional view of a contactor in accordance with an exemplary embodiment.

FIG. 3 is a cross-sectional view of a contactor 100 in accordance with an exemplary embodiment. FIG. 3 shows the contacts 120, 122 and the actuator 202 in the cavity 112 of the housing 110. The cover 118 is coupled to the top of the housing 110 to close and seal the cavity 112. The fixed contacts 120 extend through the cover 118 to the exterior of the housing 110.

The fixed contacts 120 each include a terminating end 130 and a mating end 132. The terminating end 130 is configured to be terminated to another component, such as a wire or a terminal, such as a line in or a line out wire. In an exemplary embodiment, the terminating end 130 is exposed at the exterior of the contactor 100 for terminating to the other component. The terminating end 130 may be threaded to receive a nut. In the illustrated embodiment, the terminating end 130 extends through the cover 118 and is located above the cover 118. The mating end 132 is located within the cavity 112 for mating engagement with the movable contact 122, such as when the contactor 100 is energized. In the illustrated embodiment, the mating end 132 is generally flat for engaging the movable contact 122. However, the mating end 132 may have other shapes in alternative embodiments, such as a rounded shape to form a mating bump at the mating end 132 for mating with the movable contact 122.

In various embodiments, the contactor 100 may include an arc suppressor (not shown) for suppressing electrical arc of the electrical circuit. The arc suppressor may be located in the cavity 112 of the housing 110. The arc suppressor may include magnets creating magnetic fields for suppressing arc created between the movable contact 122 and the fixed contacts 120. In various embodiments, the cavity 112 may be sealed and may be filled with an inert gas for arc suppression.

The actuator 202 is located in the cavity 112 and used for actuating or moving the movable contact 122. In an exemplary embodiment, the actuator 202 includes a first coil assembly 204 (also referred to hereinafter as a primary coil assembly 204) and a second coil assembly 206 (also referred to hereinafter as a secondary coil assembly 206) for operating the switch. The primary coil assembly 204 and the secondary coil assembly 206 are operable independently to control switching of the movable contact 122. The primary coil assembly 204 and the secondary coil assembly 206 are operable independently for different operation modes. In an exemplary embodiment, the primary coil assembly 204 is operated to move the movable contact 122. The secondary coil assembly 206 is operated to change the position of components of the primary coil assembly 204, such as to change the mating gap between the movable contact 122 and the fixed contacts 120. In the illustrated embodiment, the coil assemblies 204, 206 are stacked in the cavity 112 with a wall 208 therebetween. For example, the primary coil assembly 204 may be located above the secondary coil assembly 206, such as closer to the fixed contacts 120.

The primary coil assembly 204 includes a primary winding or primary coil 300 wound around a primary core 302 to form a first electromagnet 304. The primary coil assembly 204 includes a primary armature 306 received in a primary sleeve 308. The primary coil assembly 204 includes a primary plunger 310 coupled to the primary armature 306. A primary return spring 320 surrounds the primary plunger 310. During operation, the primary coil 300 is electrically energized to create a magnetic field. The primary armature 306 is advanced, such as in an upward actuation direction, when the primary electromagnet 304 is activated to move the primary plunger 310, and thus the movable contact 122 in the advancing direction. When the primary electromagnet 304 is deenergized, the primary return spring 320 returns the primary armature 306, and thus the primary plunger 310 and the movable contact 122 in a return direction (for example, downward) to unmate the movable contact 122 form the fixed contacts 120 and open the main circuit.

The primary plunger 310 extends between a first end 312 and a second end 314. In the illustrated embodiment, the first end 312 is a top of the primary plunger 310 and the second end 314 is a bottom of the primary plunger 310. However, other orientations are possible in alternative embodiments. The movable contact 122 is coupled to the primary plunger 310 at the first end 312. For example, the primary plunger 310 extends through an opening in a center of the movable contact 122. A first retainer clip 322 is coupled to the primary plunger 310 at the first end 312. The first retainer clip 322 retains the movable contact 122 on the first end 312 of the primary plunger 310. A holding spring 324 surrounds the primary plunger 310 and is hold on the primary plunger 310 by a retainer clip 326. The holding spring 324 engages the movable contact 122 and holds the movable contact 122 on the end of the primary plunger 310. The holding spring 324 may be compressed when the movable contact 122 engages the fixed contacts 120. The holding spring 324 may hold the movable contact 122 in engagement with the fixed contacts 120. In an exemplary embodiment, a second retainer clip 328 is coupled to the primary plunger 310 at the second end 314. The second retainer clip 328 is used to couple the primary plunger 310 to the primary armature 306. The second retainer clip 328 engages a bottom surface of the primary armature 306 to hold the primary plunger 310 in the central bore of the primary armature 306. The primary return spring 320 holds the bottom surface of the primary armature 306 against the second retainer clip 328. The primary plunger 310 is movable with the primary armature 306 based on the activation and deactivation of the first electromagnet 304.

In an exemplary embodiment, the second end 312 of the primary plunger 310 is coupled to the secondary plunger of the secondary coil assembly 206. For example, the primary plunger 310 includes a mounting foot 330 at the second end 312. The mounting foot 330 is received in the secondary plunger. The mounting foot 330 includes a shaft 332 and a flange 334 at an end of the shaft 332. The shaft 332 is slidable within the secondary plunger. The flange 334 bottoms out against the secondary plunger to control the amount of floating movement of the primary plunger 310 relative to the secondary plunger. The mounting foot 330 is capable of moving a sufficient distance relative to the secondary plunger to allow mating of the movable contact 122 with the fixed contacts 120 and unmating of the movable contact 122 from the fixed contacts 120 to close and open the main circuit when the first electromagnet is activated and deactivated.

The primary coil assembly 204 is located above the wall 208 and the secondary coil assembly 206 is located below the wall 208. The secondary coil assembly 206 includes a secondary winding or secondary coil 400 wound around a secondary core 402 to form a second electromagnet 404. The secondary coil assembly 206 includes a secondary armature 406 received in a secondary sleeve 408. The secondary coil assembly 206 includes a secondary plunger 410 coupled to the secondary armature 406. A secondary return spring 420 surrounds the secondary plunger 410. In an exemplary embodiment, the secondary coil assembly 206 includes a permanent magnet 450 at a bottom of the secondary coil assembly 206.

In an exemplary embodiment, the permanent magnet 450 normally holds the secondary armature 406, and thus the secondary plunger 410, in an elevated or upward position. During operation, when the secondary coil 400 is electrically energized to create a magnetic field, the secondary armature 406 is moved in a downward actuation direction to move the secondary plunger 410 in a downward direction away from the fixed contacts 120. The electromagnetic field overcomes the effect of the permanent magnet 450 to allow the secondary armature 406 and the secondary plunger 410 in the downward direction. The secondary return spring 420 forces the secondary armature 406 in the downward direction. The secondary plunger 410 may bottom out against the permanent magnet 450. When the second electromagnet 404 is deactivated, the permanent magnet 450 again forces the secondary armature 406, and thus the secondary plunger 410, to move in an upward direction. Moving the secondary plunger 410 changes the position of the primary plunger 310, such as to change the mating distance for the movable contact 122 with the fixed contacts 120.

The secondary plunger 410 extends between a first end 412 and a second end 414. In the illustrated embodiment, the first end 412 is a top of the secondary plunger 410 and the second end 414 is a bottom of the secondary plunger 410. However, other orientations are possible in alternative embodiments. The primary plunger 310 is coupled to the secondary plunger 410 at the first end 412. For example, the mounting foot 330 of the secondary plunger 410 is coupled to the first end 412 of the secondary plunger 410. In an exemplary embodiment, the secondary plunger 410 extends through an opening in a center of the wall 208 such that the first end 412 is located above the wall 208 to interface with the primary plunger 310.

In an exemplary embodiment, a secondary retainer clip 422 is coupled to the secondary plunger 410 at the second end 414. The secondary retainer clip 422 is used to couple the secondary plunger 410 to the secondary armature 406. The secondary retainer clip 422 engages a bottom surface of the secondary armature 406 to hold the secondary plunger 410 in the central bore of the secondary armature 406. The secondary return spring 420 holds the bottom surface of the secondary armature 406 against the secondary retainer clip 422. The secondary plunger 410 is movable with the secondary armature 406 based on the activation and deactivation of the second electromagnet 404.

In an exemplary embodiment, the first end 412 of the secondary plunger 410 includes a pocket 430 that receives the mounting foot 330 of the primary plunger 310. The secondary plunger 410 includes a shoulder 432 extending into the pocket 430, such as at a top of the pocket 430. The shoulder 432 may be formed by a retainer clip coupled to the secondary plunger 410. The shoulder 432 is used to retain or capture the flange 334 of the mounting foot 330 in the pocket 430. The mounting foot 330 is movable within the pocket 430. For example, the mounting foot 330 may be vertically slidable within the pocket 430. The pocket 430 is sized to allow actuation of the first electromagnet 304 independent of operation of the second electromagnet 404. For example, the first electromagnet 304 may be activated to open and close the movable contact 122 relative to the fixed contacts 120 without operating the second electromagnet 404. In various embodiments, the second electromagnet 404 may be activated to move the secondary plunger 410 independent of operation of the first electromagnet 304. The flange 334 is configured to bottom out against the secondary plunger 310 during operation of the first electromagnet 304 to control the amount of floating movement of the primary plunger 310 relative to the secondary plunger 410. For example, the flange 334 may bottom out against the shoulder 432 at the top of the actuation stroke and may bottom out against a bottom 434 of the pocket 430 at the bottom of the actuation stroke. The mounting foot 330 is capable of moving a sufficient distance relative to the secondary plunger 410 to allow mating of the movable contact 122 with the fixed contacts 120 and unmating of the movable contact 122 from the fixed contacts 120 to close and open the main circuit when the first electromagnet 304 is activated and deactivated.

Figure 4:
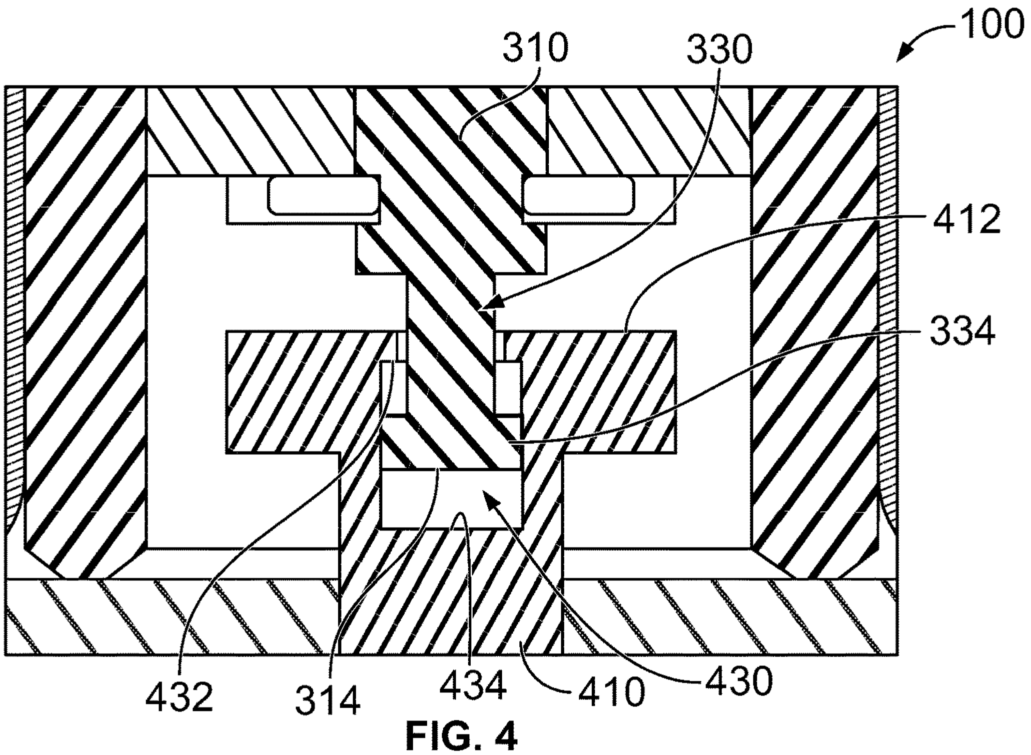
FIG. 4 is an enlarged view of a portion of the contactor in accordance with an exemplary embodiment showing the first coil assembly coupled to the second coil assembly.

FIG. 4 is an enlarged view of a portion of the contactor 100 in accordance with an exemplary embodiment showing the first coil assembly 204 coupled to the second coil assembly 206. The mounting foot 330 of the primary plunger 310 at the second end 314 of the primary plunger 310 is received in the pocket 430 at the first end 412 of the secondary plunger 410. The mounting foot 330 is movable within the pocket 430. The flange 334 is shown spaced apart from the shoulder 432 at the top of the secondary plunger 410 and spaced apart from the bottom 434 of the pocket 430. In the illustrated position, the primary plunger 310 is movable relative to the secondary plunger 410 in either direction and/or the secondary plunger 410 is movable relative to the primary plunger 310 in either direction. For example, either electromagnet 304, 404 may be activated or deactivated to move the corresponding plungers 310, 410.

Figure 5:
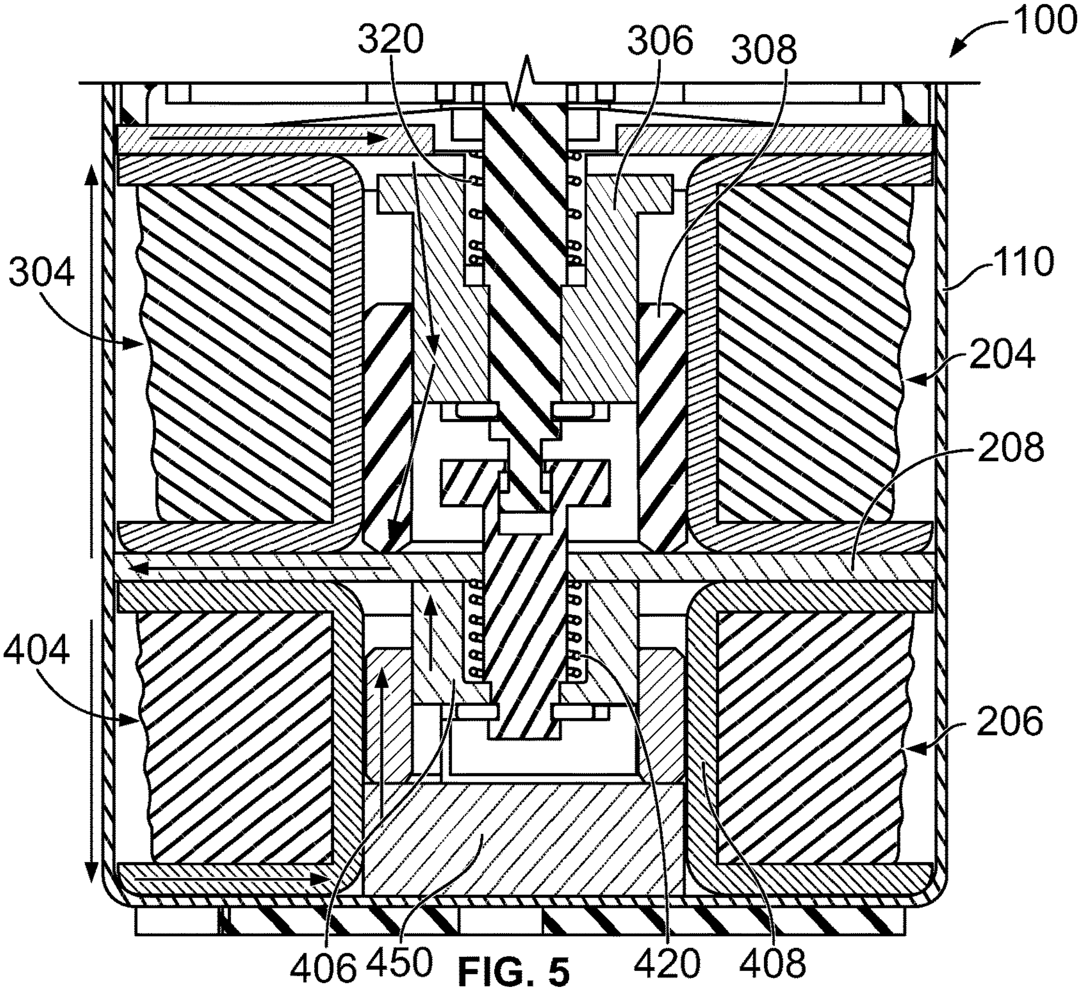
FIG. 5 is an enlarged view of a portion of the contactor in accordance with an exemplary embodiment showing the first coil assembly and the second coil assembly.

FIG. 5 is an enlarged view of a portion of the contactor 100 in accordance with an exemplary embodiment showing the first coil assembly 204 and the second coil assembly 206. FIG. 5 shows the primary magnetic circuit path of the primary coil assembly 204 and the secondary magnetic circuit path of the secondary coil assembly 206 when the electromagnets 304, 404 are activated. The primary magnetic circuit path flows through the walls of the housing 110, including the wall 208, as well as the primary armature 306 and the primary sleeve 308. The secondary magnetic circuit path flows through the walls of the housing 110, including the wall 208, as well as the secondary armature 406, the secondary sleeve 408, and the permanent magnet 450. In the illustrated embodiment, the primary magnetic circuit path flows in a clockwise direction and the secondary magnetic circuit path flows in a counter-clockwise direction. Other flow path directions are possible in alternative embodiments.

Tertiary magnetic leakage paths, shown by the dotted path, may occur and may flow in the same direction or the opposite direction as either the primary magnetic circuit path or the secondary magnetic circuit path. In an exemplary embodiment, the spring forces of the return springs 320, 420 are sufficient to overcome any effects of the tertiary magnetic leakage paths. In various embodiments, the detrimental effects of the tertiary magnetic leakage paths can be mitigated by adding a second mid-core and air gap if needed.

Figure 6:
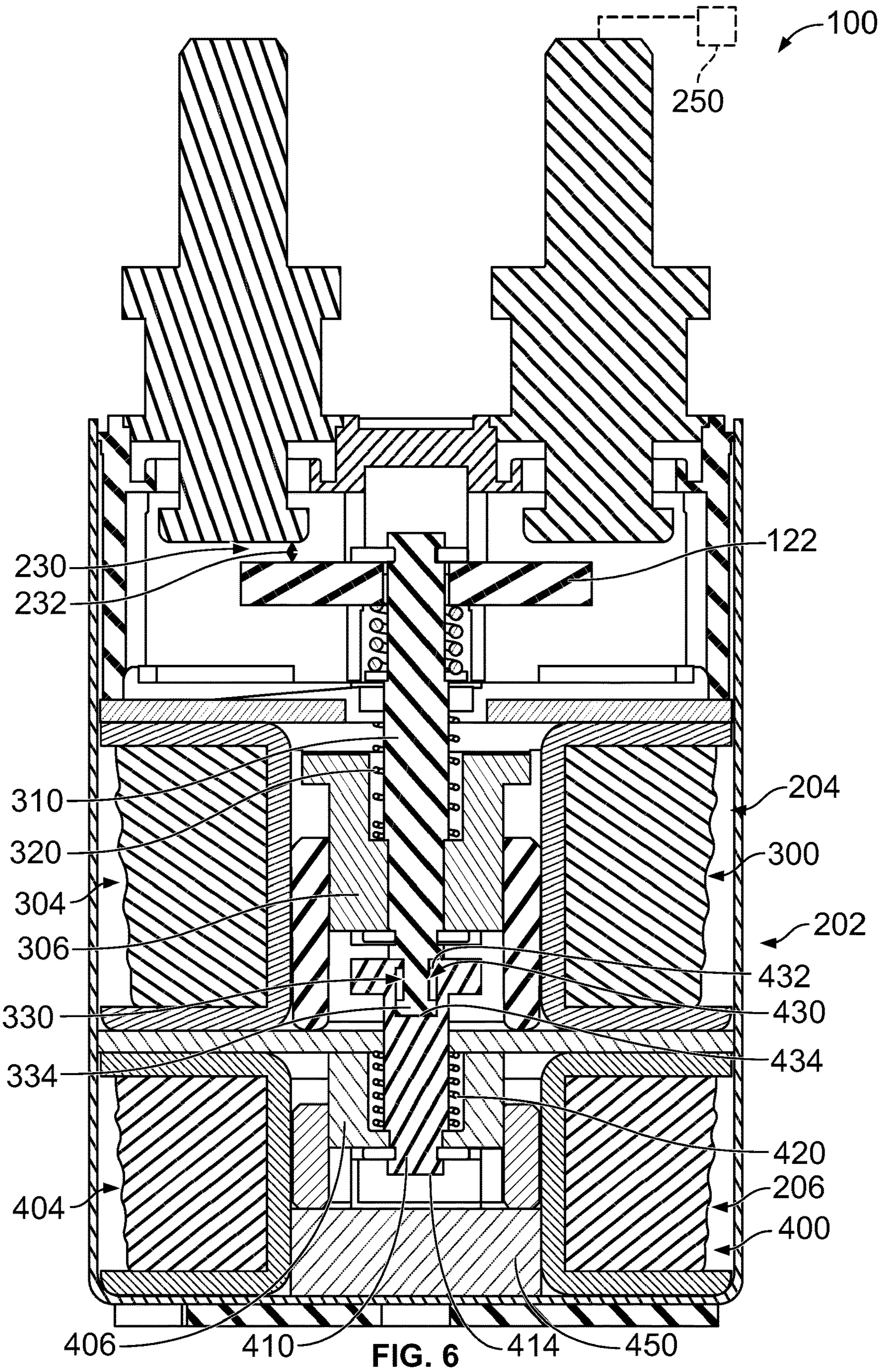
FIG. 6 is a cross-sectional views of the contactor showing the primary and secondary coil assemblies in accordance with an exemplary embodiment.
Figure 7:
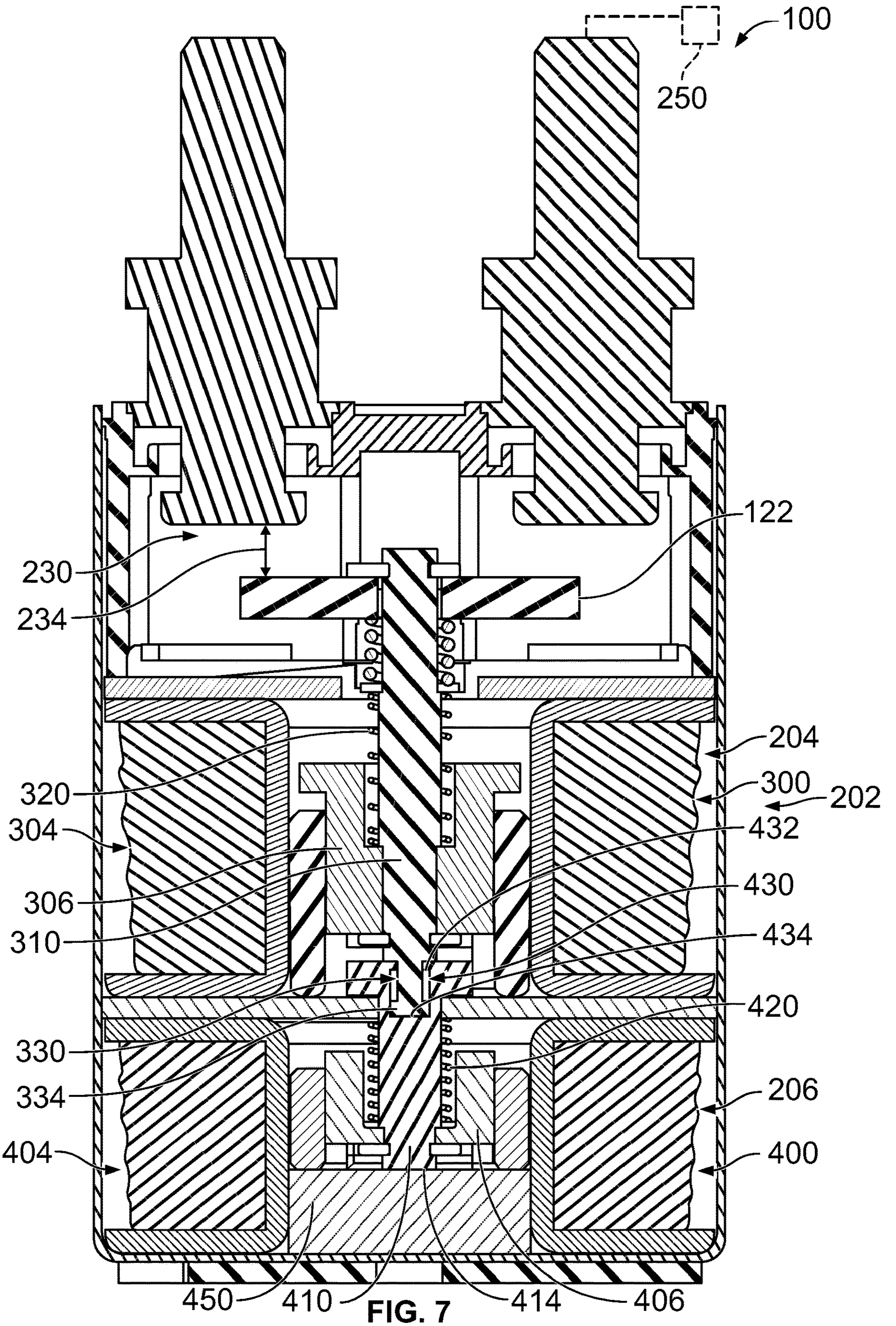
FIG. 7 is a cross-sectional views of the contactor showing the primary and secondary coil assemblies in accordance with an exemplary embodiment.
Figure 8:
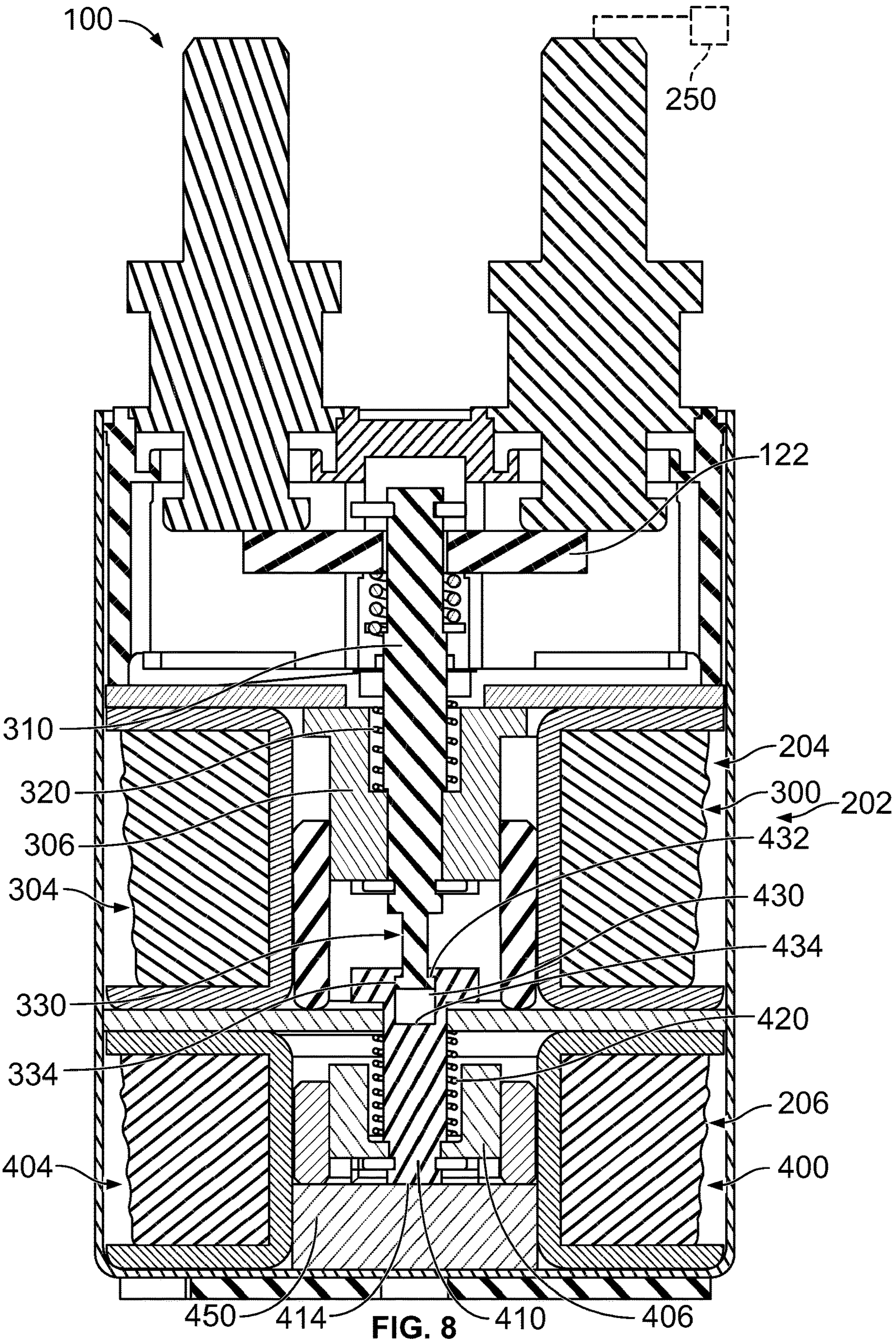
FIG. 8 is a cross-sectional views of the contactor showing the primary and secondary coil assemblies in accordance with an exemplary embodiment.

With reference back to FIG. 3 as well as FIGS. 6-8, the various modes of operation are illustrated. FIGS. 6-8 are cross-sectional views of the contactor 100 showing the primary and secondary coil assemblies 204, 206 in various states. FIG. 3 illustrates the contactor 100 in a first mode showing the primary coil assembly 204 activated and the secondary coil assembly 206 deactivated. FIG. 6 illustrates the contactor 100 in a second mode showing the primary coil assembly 204 deactivated and the secondary coil assembly 206 deactivated. FIG. 7 illustrates the contactor 100 in a third mode showing the primary coil assembly 204 deactivated and the secondary coil assembly 206 activated. FIG. 8 illustrates the contactor 100 in a fourth mode showing the primary coil assembly 204 activated and the secondary coil assembly 206 activated. In an exemplary embodiment, the primary coil assembly 204 is operable to move the movable contact 122. The secondary coil assembly 206 is operable independently from the primary coil assembly 204 to change a length of a mating gap 230 between the movable contact 122 and the fixed contacts 120. FIGS. 3 and 6-8 illustrate the various combinations of activation/deactivation of the primary and secondary coil assemblies 204, 206 showing the mating contact 112 mated and unmated by operating the primary coil assembly 204 and showing the short mating gap versus the extended mating gap created by operating the secondary coil assembly 206.

During operation, when the primary electromagnet 304 is activated (FIGS. 3 and 8), the primary coil 300 is electrically energized to create a magnetic field. The primary armature 306 is advanced, such as in an upward actuation direction, to move the primary plunger 310, and thus the movable contact 122 in the advancing direction. When activated, the movable contact 122 is mated with the fixed contacts 120 to close the main circuit and allow power transmission through the fixed contacts 120 and the movable contact 122. When the primary electromagnet 304 is deactivated (FIGS. 6 and 7), the primary coil 300 is deenergized removing the magnetic field and allowing the primary return spring 320 to return the primary armature 306, and thus the primary plunger 310 and the movable contact 122 in the return direction (for example, downward). When deactivated, the movable contact 122 is unmated from the fixed contacts 120 to open the main circuit.

During operation, when the secondary electromagnet 404 is activated (FIGS. 7 and 8), the secondary coil 400 is electrically energized to create a magnetic field. The secondary armature 406 is moved in a downward actuation direction to move the secondary plunger 410 in a downward direction away from the fixed contacts 120. The electromagnetic field overcomes the effect of the permanent magnet 450 to allow the secondary armature 406 and the secondary plunger 410 in the downward direction. The secondary return spring 420 forces the secondary armature 406 in the downward direction. The secondary plunger 410 bottoms out against the permanent magnet 450. When the secondary electromagnet 404 is deactivated (FIGS. 3 and 6), the secondary coil 400 is deenergized removing the magnetic field and allowing the permanent magnet 450 to force the secondary armature 406, and thus the secondary plunger 410, to move in the upward direction.

The secondary coil assembly 206 is operated to move the primary coil assembly 204 relative to the fixed contacts 120. The secondary plunger 410 controls vertical movement limits of the primary plunger 310 relative to the secondary plunger 410 to control a stroke or mating distance of the primary plunger 310 when the primary coil assembly 204 is operated. For example, the secondary coil assembly 206 is operated to move the stop location of the primary plunger 310 relative to the fixed contacts 120 to change the stroke length or mating distance needed to close the movable contact 122 to the fixed contacts 120. The secondary plunger 410 controls a position of the primary plunger 310 relative to the fixed contacts 120. For example, moving the secondary plunger 410 changes the position of the primary plunger 310, such as to change the mating distance for the movable contact 122 with the fixed contacts 120. In an exemplary embodiment, the actuator 202 is operable in a short gap mode (FIGS. 3 and 6) when the secondary electromagnet 404 is deactivated and the actuator 202 is operable in an extended gap mode (FIGS. 7 and 8) when the secondary electromagnet 404 is activated. The mating gap 230 between the movable contact 122 and the fixed contacts 120 has a first length 232 (FIG. 6) in the short gap mode and the mating gap 230 has a second length 234 (FIG. 7) in the extended gap mode. The first length 232 is shorter than the second length 234.

When assembled, the mounting foot 330 at the bottom of the primary plunger 310 is received in the pocket 430 at the top of the secondary plunger 410. The mounting foot 330 is vertically slidable within the pocket 430. For example, the flange 334 is movable between the shoulder 432 at the top of the pocket 430 and the bottom 434 of the pocket 430. The shoulder 432 defines the upper movement limit for the flange 334 and the bottom 434 defines a lower movement limit for the flange 334. Changing the location of the secondary plunger 410 relative to the fixed contacts 120 changes the locations of the upper and lower stops for the primary plunger 310. For example, by activating and deactivating the second electromagnet 404 to change the vertical position of the secondary plunger 410, the starting and ending positions of the primary plunger 310 may be changed, such as to change the stroke or mating distance.

The first and second electromagnets 304, 404 are operable independently for different operation modes. For example, the actuator 202 may be operated in a first mode for normal operation, may be operated in a second mode for safety operation, such as when transmitting high currents, and may be operable in a third mode for service operation, such as for weld breaking when the movable contact 122 is stuck to the fixed contacts 120. The actuator 202 changes the mating gap 230 between the movable contact 122 and the fixed contacts 120 between the various modes, such as to increase or decrease the mating gap 230 to change the switching time for closing the movable contact 122 or to enhance circuit interruption performance.

The first mode is used for normal operation. The first mode is a short gap mode where the mating gap 230 is relatively short (for example, compared to the extended gap mode). In an exemplary embodiment, in the short gap mode the secondary coil assembly 206 is in the advanced or forward position (FIGS. 3 and 6). For example, the second electromagnet 404 is deactivated. Repulsive forces of the permanent magnet 450 forces the secondary armature 406 and the secondary plunger 410 to the advanced position (for example, closer to the fixed contacts 120). In the advanced position, the rear stop for the primary plunger 310 (for example, the bottom 434 of the pocket 430) is forward positioned compared to the rearward or retracted position shown in FIGS. 7 and 8. The primary plunger 310 is thus forward positioned and the mating gap 230 is shortened to allow quick opening and closing (for example, quick movement between the positions shown in FIGS. 3 and 6). Energizing of the primary coil 300 allows the movable contact 120 to be quickly moved from the open position (FIG. 6) to the closed position (FIG. 3). In the short gap mode, the contactor 100 is a fast operating contactor.

The second mode is used for safety operation, such as for high current interruption. The second mode is an extended gap mode when the mating gap 230 is relatively long (for example, compared to the short gap mode). In an exemplary embodiment, in the extended gap mode, the secondary coil assembly 206 is in the retracted or rearward position (FIGS. 7 and 8). For example, the second electromagnet 404 is activated to overcome the repulsive magnetic force of the permanent magnet 450 and drive the secondary armature 406 and secondary plunger 410 in the downward direction. The second end 414 of the secondary plunger 410 may bottom out against the permanent magnet 450 in the retracted position. In the retracted position, the rear stop for the primary plunger 310 (for example, the bottom 434 of the pocket 430) is rearward positioned compared to the forward or advanced position shown in FIGS. 3 and 6. The primary plunger 310 is thus rearward positioned and the mating gap 230 is extended to provide higher current interruption and reduce the risk of electrical arcing. The primary plunger 310 has a longer stroke or travel distance to move from the open position (FIG. 7) to the closed position (FIG. 8).

In an exemplary embodiment, the secondary plunger 410 defines a magnetically latched stop for the primary plunger 310. For example, the permanent magnet 450 below the secondary plunger 410 is used to magnetically actuate the secondary plunger 410, such as to hold the secondary plunger 410 in the advanced position until the second electromagnet 404 is activated. In an exemplary embodiment, the permanent magnet 450 forms a latching stop for the secondary plunger 410. For example, the secondary plunger 410 engages the permanent magnet 450 when the secondary coil assembly 206 is operated.

The secondary plunger 410 is interlocked with the primary plunger 310 to control or limit movement of the primary plunger 310. The primary plunger 310 has a limited amount of floating movement between an upper vertical limit (for example, flange 334 engages the shoulder 432) and a lower vertical limit (for example, flange 334 engages the bottom 434). The secondary plunger 410 moves the primary plunger 310 away from the fixed contacts 120 when the secondary plunger 410 is actuated beyond the lower vertical limit.

The third mode is used for service operation, such as for weld breaking when the movable contact 122 is stuck to the fixed contacts 120. For example, in some situations, the movable contact 122 may become welded to the fixed contacts 120 due to high current operation and/or arcing. The secondary plunger 410 may be pulsed and/or modulated to repeatedly advance and retract the secondary plunger 410 to break the weld and free the movable contact 122. For example, the secondary plunger 410 is used to hammer against the primary plunger 310 to break the weld. The shoulder 432 is impacted against the flange 334 to induce downward force against the primary plunger 310, which is transferred to the movable contact 122 to break the weld. In an exemplary embodiment, the first electromagnet 304 is in the deactivated state in the third mode. The second electromagnet 404 is activated and deactivated (for example, pulsed between the advanced position (FIG. 6) and the retracted position (FIG. 7)) in the third mode. Once the movable contact 122 is free, the contactor 100 may be operated in the first mode or the second mode.

In an exemplary embodiment, the actuator 202 includes a current sensor 250 sensing a current of the main circuit through the fixed contacts 120 and the movable contact 122. The secondary coil assembly 206 is operably coupled to the current sensor 250 to activate the secondary coil assembly 206, such as when the current sensed by the current sensor is above a threshold current. The current sensor 250 is used to change operation from the first mode (for example, short gap mode) to the second mode (for example, extended gap mode). For example, the current sensor 250 may determine when the main circuit is transmitting high current to change the actuator 202 to operate in the extended gap mode and provide high current interruption. In other various embodiments, the current sensor 250 is used to determine when a weld condition has occurred between the movable contact 122 and the fixed contacts 120. For example, when the first electromagnet 304 is deactivated, but the movable contact 122 is still coupled to the fixed contacts 120, the actuator 202 may operate in the third mode to break the weld.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A contactor comprising:

a housing having a cavity;

fixed contacts received in the cavity, the fixed contacts having mating ends in the cavity;

a movable contact movable within the cavity between a mated position and an open position to mate to the fixed contacts and unmate from the fixed contacts, the movable contact electrically connecting the fixed contacts in the mated position, a mating gap being formed between the movable contact and the fixed contacts when the movable contact is unmated from the fixed contacts in the open position;

an actuator operably coupled to the movable contact to move the movable contact within the cavity relative to the fixed contacts, the actuator including a primary coil assembly and a secondary coil assembly, the primary coil assembly including a primary plunger coupled to the movable contact, the primary coil assembly operable to move the movable contact between the open position and the mated position, the secondary coil assembly including a secondary plunger coupled to the primary plunger, the secondary coil assembly operable independently from the primary coil assembly to change a length of the mating gap, the secondary plunger varying a position of the primary plunger relative to the fixed contacts in the open position to control the length of the mating gap.

2. The contactor of claim 1, wherein the actuator is operable in a short gap mode and an extended gap mode, wherein the mating gap has a first length in the short gap mode and the mating gap has a second length in the extended gap mode, the first length being shorter than the second length.

3. The contactor of claim 1, wherein the primary plunger extending between a first end and a second end, the first end being coupled to the movable contact, the second end being slidably coupled to the secondary plunger.

4. The contactor of claim 3, wherein the secondary plunger controls vertical movement limits of the primary plunger relative to the secondary plunger to control a stroke of the primary plunger when the primary coil assembly is operated.

5. The contactor of claim 3, wherein the secondary plunger includes a pocket at an end of the secondary plunger and a shoulder extending into the pocket, the primary plunger including a mounting foot at the second end of the primary plunger, the mounting foot being received in the pocket and slidable within the pocket to allow movement of the primary plunger relative to the secondary plunger, the mounting foot having a flange configured to engage the shoulder to stop movement of the primary plunger relative to the secondary plunger.

6. The contactor of claim 3, wherein the secondary plunger defines a magnetically latched stop for the primary plunger.

7. The contactor of claim 3, wherein the secondary coil assembly includes a permanent magnet below the secondary plunger, the permanent magnet forming a latching stop for the secondary plunger, the secondary plunger engaging the permanent magnet when the secondary coil assembly is operated.

8. The contactor of claim 3, wherein the secondary plunger is interlocked with the primary plunger having a limited amount of floating movement between an upper vertical limit and a lower vertical limit between the primary and secondary plungers, wherein the secondary plunger moves the primary plunger away from the fixed contacts when the secondary plunger is actuated beyond the lower vertical limit.

9. The contactor of claim 1, wherein the actuator includes a current sensor sensing a current of the main circuit through the fixed contacts and the movable contact, the secondary coil assembly operably coupled to the current sensor to activate the secondary coil assembly when the current sensed by the current sensor is above a threshold current.

10. A contactor comprising:

a housing having a cavity;

fixed contacts received in the cavity, the fixed contacts having mating ends in the cavity;

a movable contact movable within the cavity to mate to the fixed contacts and unmate from the fixed contacts, the movable contact electrically connecting the fixed contacts in the mated position, a mating gap being formed between the movable contact and the fixed contacts when the movable contact is unmated from the fixed contacts;

an actuator operably coupled to the movable contact to move the movable contact within the cavity relative to the fixed contacts, the actuator including a primary coil assembly and a secondary coil assembly;

the primary coil assembly including a primary core and a primary coil forming a first electromagnet, the primary coil assembly including a primary armature holding a primary plunger, the primary plunger coupled to the movable contact to move the movable contact, the primary armature movable upon operation of the first electromagnet to move the primary plunger and the movable contact relative to the fixed contacts;

the secondary coil assembly including a secondary core and a secondary coil forming a second electromagnet, the secondary coil assembly including a secondary armature holding a secondary plunger, the secondary plunger coupled to the primary plunger, the secondary armature movable upon operation of the second electromagnet to move the secondary plunger, wherein the secondary coil assembly is operable independently from the primary coil assembly to change a length of the mating gap by moving the position of the secondary plunger relative to the fixed contacts.

11. The contactor of claim 10, wherein the secondary plunger includes a pocket at an end of the secondary plunger and a shoulder extending into the pocket, the primary plunger including a mounting foot at an end of the primary plunger, the mounting foot being received in the pocket and slidable within the pocket to allow movement of the primary plunger relative to the secondary plunger, the mounting foot having a flange configured to engage the shoulder to stop movement of the primary plunger relative to the secondary plunger.

12. The contactor of claim 10, wherein the secondary plunger controls vertical movement limits of the primary plunger relative to the secondary plunger to control a stroke of the primary plunger when the primary coil assembly is operated.

13. The contactor of claim 10, wherein the primary plunger bottoms out against the secondary plunger when the first electromagnet is deenergized.

14. The contactor of claim 10, wherein the actuator includes a current sensor sensing a current of the main circuit through the fixed contacts and the movable contact, the secondary coil assembly operably coupled to the current sensor to activate the second electromagnet when the current sensed by the current sensor is above a threshold current.

15. The contactor of claim 10, wherein the actuator is operable in a short gap mode and an extended gap mode, wherein the mating gap has a first length in the short gap mode and the mating gap has a second length in the extended gap mode, the first length being shorter than the second length.

16. The contactor of claim 10, wherein the secondary coil assembly is operated to move the primary coil assembly relative to the fixed contacts.

17. A contactor comprising:

a housing having a cavity;

fixed contacts received in the cavity, the fixed contacts having mating ends in the cavity;

a movable contact movable within the cavity between a mated position and an open position to mate to the fixed contacts and unmate from the fixed contacts, the movable contact electrically connecting the fixed contacts in the mated position, a mating gap being formed between the movable contact and the fixed contacts when the movable contact is unmated from the fixed contacts in the open position;

an actuator operably coupled to the movable contact to move the movable contact within the cavity relative to the fixed contacts, the actuator operable to close the mating gap and connect the moveable contact to the fixed contacts in both a short gap mode and an extended gap mode, wherein the open position of the movable contact is variable such that the mating gap between the movable contact and the fixed contacts has a first length in the short gap mode and the mating gap between the movable contact and the fixed contacts has a second length in the extended gap mode, the first length being shorter than the second length.

18. The contactor of claim 17, wherein the actuator includes a primary coil assembly and a secondary coil assembly, the primary coil assembly operable to move the movable contact, the secondary coil assembly operable independently from the primary coil assembly to change between the short gap mode and the extended gap mode.

19. The contactor of claim 18, wherein the primary coil assembly includes a primary plunger coupled to the movable contact, the secondary coil assembly including a secondary plunger coupled to the primary plunger, the secondary plunger controlling a position of the primary plunger relative to the fixed contacts.

20. The contactor of claim 18, wherein the primary coil assembly includes a primary plunger and the secondary coil assembly includes a secondary plunger, the primary plunger extending between a first end and a second end, the first end being coupled to the movable contact, the second end being slidably coupled to the secondary plunger.

* * * * *